United States Patent
Onishi et al.

(10) Patent No.: US 9,362,795 B2
(45) Date of Patent: Jun. 7, 2016

(54) AUTOMOTIVE ROTARY ELECTRIC MACHINE STATOR AND MANUFACTURING METHOD THEREFOR

(75) Inventors: Yukiyoshi Onishi, Chiyoda-ku (JP); Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 44 days.

(21) Appl. No.: 14/372,231

(22) PCT Filed: Mar. 19, 2012

(86) PCT No.: PCT/JP2012/057044
§ 371 (c)(1),
(2), (4) Date: Jul. 15, 2014

(87) PCT Pub. No.: WO2013/140508
PCT Pub. Date: Sep. 26, 2013

(65) Prior Publication Data
US 2014/0333172 A1    Nov. 13, 2014

(51) Int. Cl.
H02K 3/12 (2006.01)
H02K 3/28 (2006.01)
H02K 15/04 (2006.01)
H02K 15/02 (2006.01)
H02K 15/06 (2006.01)

(52) U.S. Cl.
CPC .. *H02K 3/28* (2013.01); *H02K 3/12* (2013.01); *H02K 15/024* (2013.01); *H02K 15/0485* (2013.01); *H02K 15/066* (2013.01); *Y10T 29/49009* (2015.01)

(58) Field of Classification Search
None
See application file for complete search history.

(56) References Cited

U.S. PATENT DOCUMENTS

| | | | | |
|---|---|---|---|---|
| 6,960,857 B2 * | 11/2005 | Oohashi | ........... | H02K 3/12 310/179 |
| 2002/0079772 A1 | 6/2002 | Oohashi et al. | | |
| 2010/0026132 A1 * | 2/2010 | Ooiwa | ........... | H02K 3/12 310/201 |

FOREIGN PATENT DOCUMENTS

| | | |
|---|---|---|
| JP | 2002-199677 A | 7/2002 |
| JP | 2003-88021 A | 3/2003 |
| JP | 2003-219588 A | 7/2003 |
| JP | 2006-340409 A | 12/2006 |
| JP | 2011-125135 A | 6/2011 |
| WO | 2004/062065 A1 | 7/2004 |

OTHER PUBLICATIONS

Communication dated Sep. 8, 2015 from the Japanese Patent Office in counterpart application No. 2014-215338.
International Search Report for PCT/JP2012/057044 dated Jun. 19, 2012.

* cited by examiner

*Primary Examiner* — Tran Nguyen
(74) *Attorney, Agent, or Firm* — Sughrue Mion, PLLC; Richard C. Turner

(57) ABSTRACT

In the automotive rotary electric machine stator according to the present invention, a stator winding is constituted by distributed windings, slot-housed portions and root portions of coil end portions are formed so as to have flat cross sections, and the slot-housed portions are housed in the slots in contact with each other so as to line up in a single column in a radial direction such that long sides of the flat cross sections are oriented circumferentially. Flatnesses of root portions of the coil end portions that are radially adjacent and that extend outward in different circumferential directions from the slots are mutually different.

4 Claims, 9 Drawing Sheets

COMPARATIVE EXAMPLE

COMPARATIVE EXAMPLE

AUTOMOTIVE ROTARY ELECTRIC MACHINE STATOR AND MANUFACTURING METHOD THEREFOR

CROSS REFERENCE TO RELATED APPLICATIONS

This application is a National Stage of International Application No. PCT/JP2012/057044 filed Mar. 19, 2012, the contents of which are incorporated herein by reference in their entirety.

TECHNICAL FIELD

The present invention relates to an automotive rotary electric machine stator for an automotive alternator, etc., and to a manufacturing method therefor.

BACKGROUND ART

In conventional rotary electric machine stators, slot-housed portions of a stator winding are formed so as to have racetrack-shaped cross sections, and the slot-housed portions are housed inside slots in contact with each other so as to line up in at least one column in a radial direction such that longitudinal directions of the cross sections are oriented in a circumferential direction (see Patent Literature 1, for example). Electric conductor space factor inside the slots has been increased by making the slot-housed portions into racetrack-shaped cross sections, improving electric power generating efficiency. Reductions in workability and reliability have been suppressed by making coil ends, which are subjected to bending and twisting, into circular cross sections, in which large flexural stresses are less likely to occur.

CITATION LIST

Patent Literature

[Patent Literature 1]
International Publication No. WO/2004/062065 (Pamphlet)

SUMMARY OF THE INVENTION

Problem to be Solved by the Invention

In the invention that is described in Patent Literature 1, a winding unit that is formed into a cylindrical shape is mounted onto an annular stator core by bending coil end groups of the winding unit radially inward, disposing the winding unit so as to be coaxial to the stator core and moving it in an axial direction to house the slot-housed portions in the slots of the stator core, and subsequently restoring to the axial direction the coil end groups that are bent radially inward. However, winding units that correspond in number to the number of phases and connection specifications of the rotary electric machine are required, and the winding unit mounting operation is repeated. Here, because the coil end groups of the winding units that are mounted into the stator core previously hinder the mounting of subsequent winding units, radially outward bending is applied to the coil end groups of the winding units that are mounted previously.

Now, the stator winding in the invention that is described in Patent Literature 1 is formed into a distributed winding in which half of a plurality of conductor wires that extend outward from the slots enters other slots that are separated by a predetermined number of slots in a first circumferential direction, and a remaining half enters other slots that are separated by a predetermined number of slots in a second circumferential direction. Thus, when the coil end groups of the winding units that are mounted onto the stator core are bent radially outward, root portions near the slots of the coil end groups that enter other slots that are separated by a predetermined number of slots in the first circumferential direction from the slots in question are pulled in the first circumferential direction. At the same time, root portions near the slots of the coil end groups that enter other slots that are separated by a predetermined number of slots in the second circumferential direction from the slots in question are pulled in the second circumferential direction. Thus, one problem has been that root portions of the coil ends that are radially adjacent and extend in different circumferential directions rub against each other, damaging insulating coatings.

The present invention aims to solve the above problems and an object of the present invention is to provide an automotive rotary electric machine stator and a manufacturing method therefor in which slot-housed portions and root portions of coil end portions of conductor wires are formed so as to have flat cross sections, and flatnesses of root portions of coil end portions that are radially adjacent and that extend outward in different circumferential directions from slots are made mutually different than each other, to increase electric conductor space factor inside the slots, enabling electric power generating efficiency or output torque to be improved, and to suppress the occurrence of damage to insulating coatings of the root portions of the coil end portions, enabling electrical insulation to be ensured.

Means for Solving the Problem

In order to achieve the above object, according to one aspect of the present invention, there is provided an automotive rotary electric machine stator including: a stator core that includes: a cylindrical core back portion; a plurality of tooth portions that are arranged in a row circumferentially such that each extends radially inward from an inner circumferential surface of the core back portion; and a plurality of slots that are bounded by the core back portion and the tooth portions; and a stator winding that is mounted onto the stator core. The stator winding is constituted by distributed windings that include: slot-housed portions that are housed in each of the slots; and coil end portions that link together end portions of the slot-housed portions that are housed in pairs of the slots that are separated by a predetermined number of slots, the coil end portions extending outward in two circumferential directions from each of the slots, the slot-housed portions and root portions of the coil end portions that connect to the slot-housed portions are formed so as to have flat cross sections, the slot-housed portions are housed inside the slots in contact with each other so as to line up radially in at least one column, and flatnesses of root portions of the coil end portions that are radially adjacent and that extend outward in different circumferential directions from the slots are mutually different.

Effects of the Invention

According to the present invention, because the slot-housed portions are formed so as to have flat cross sections, and are housed inside the slots in contact with each other so as to line up in single columns in a radial direction, the ratio of the cross-sectional area of the slots that electrical conductors occupy is increased, enabling electric power generating efficiency and output torque to be improved.

Because flatnesses of root portions of the coil end portions that are radially adjacent and that extend outward in different circumferential directions from the slots are mutually different, interference between corner portions of the root portions of the coil end portions is suppressed. Thus, the occurrence of tearing of insulating coatings that results from the root portions of the coil end portions being displaced in opposite circumferential directions from each other is suppressed, enabling insulation performance to be improved.

DESCRIPTION OF EMBODIMENTS

Preferred embodiments of an automotive rotary electric machine stator according to the present invention will now be explained with reference to the drawings.

Embodiment 1

Figure 1:
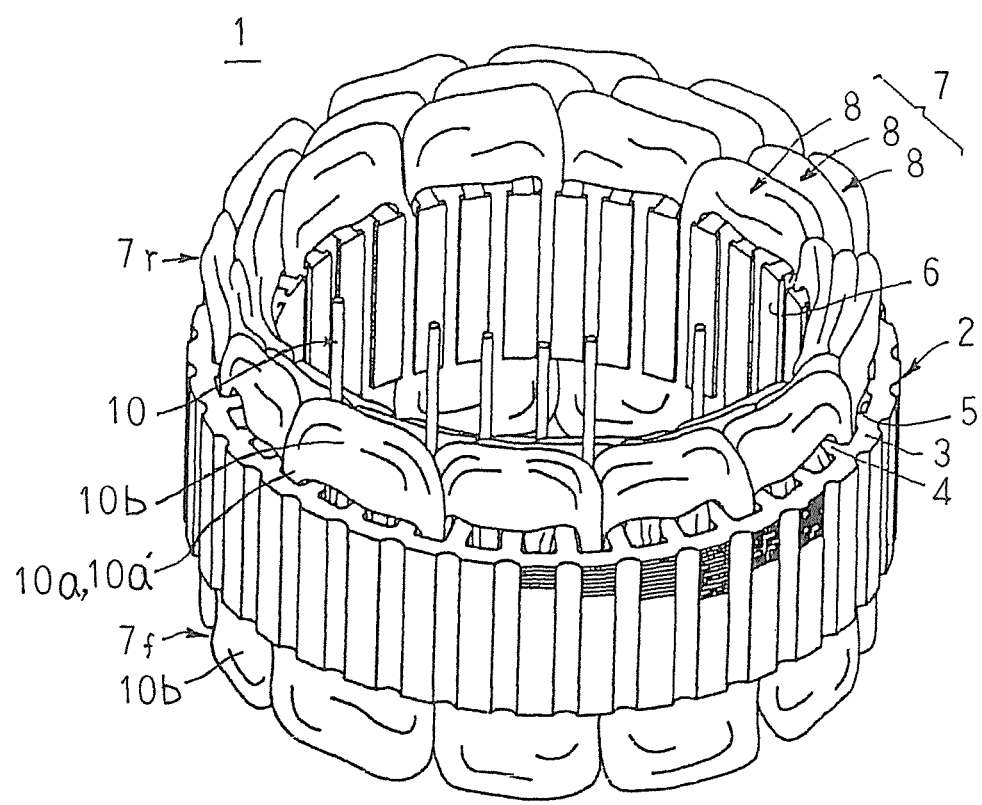
FIG. 1 is an oblique projection that shows an automotive rotary electric machine stator according to Embodiment 1 of the present invention.
Figure 2:
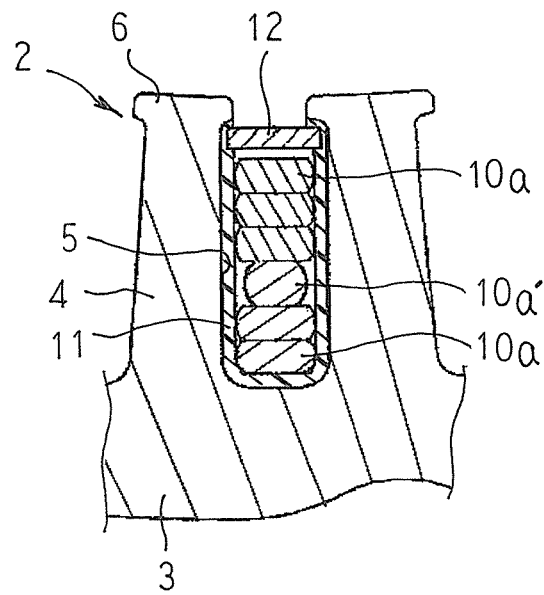
FIG. 2 is a partial cross section that explains a slot-housed state of a stator winding in the automotive rotary electric machine stator according to Embodiment 1 of the present invention.
Figure 3:
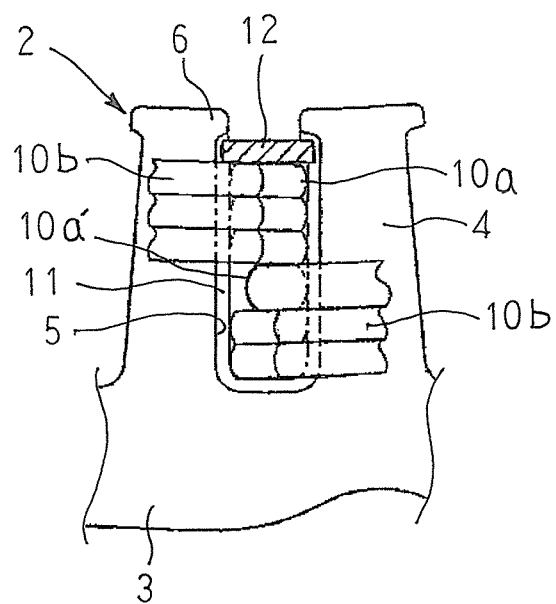
FIG. 3 is a partial end elevation that shows coil ends of the stator winding in the automotive rotary electric machine stator according to Embodiment 1 of the present invention when viewed from axially outside.
Figure 4:
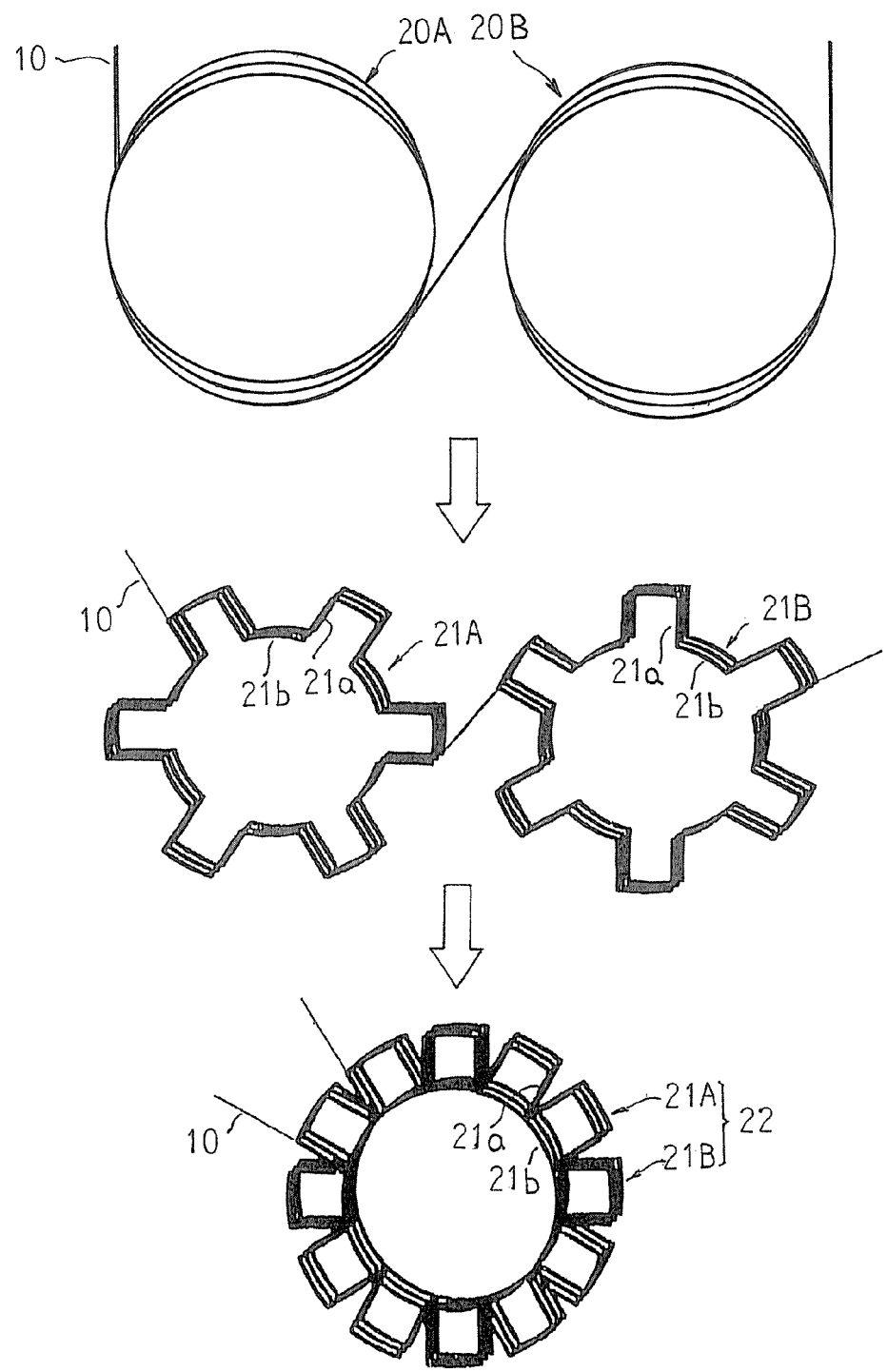
FIG. 4 is a process diagram that explains steps for manufacturing a star-shaped winding unit that is used in the stator winding in the automotive rotary electric machine stator according to Embodiment 1 of the present invention.
Figure 5:
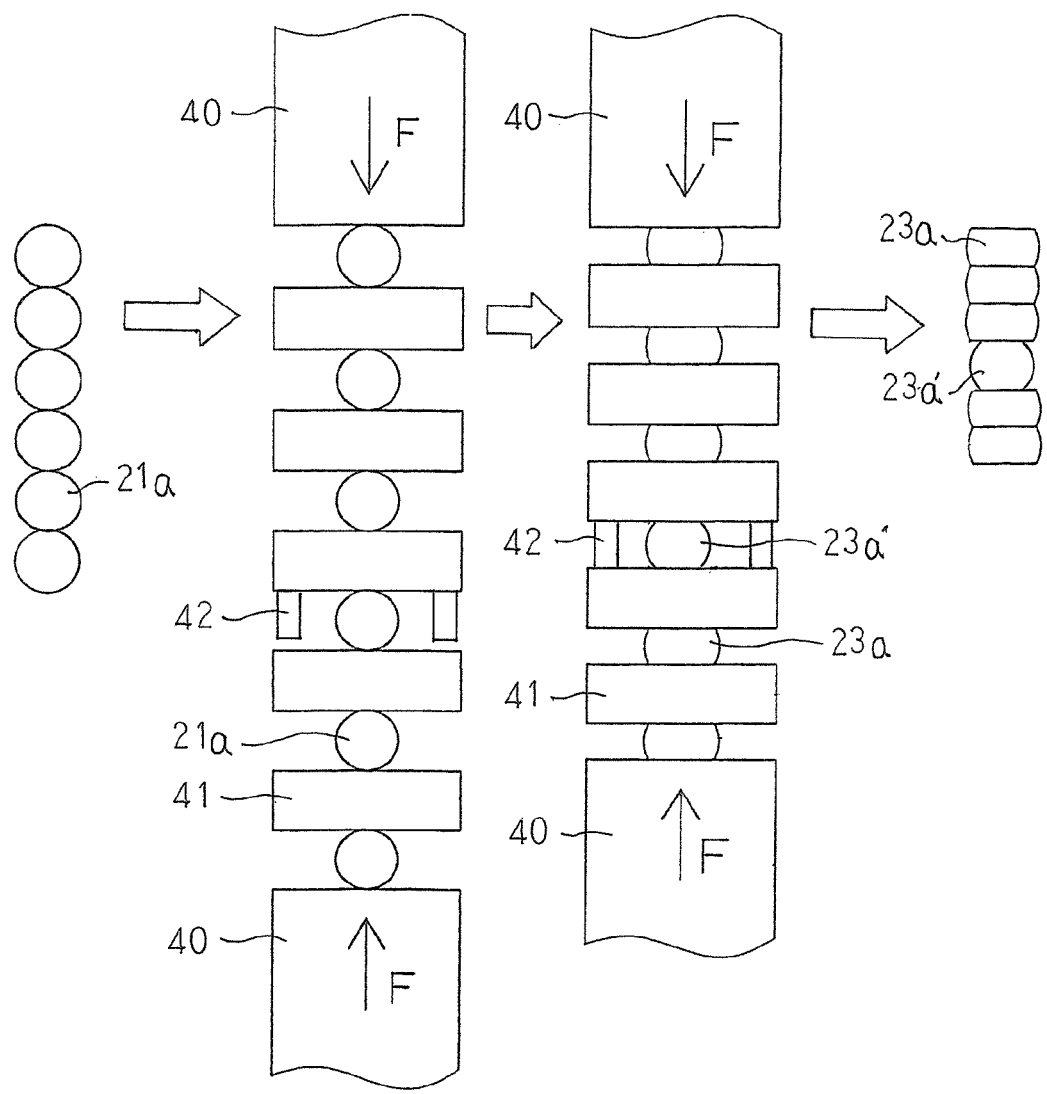
FIG. 5 is a process diagram that explains a cross section flattening step for slot-housed portions of the star-shaped winding unit in an automotive rotary electric machine stator manufacturing method according to Embodiment 1 of the present invention.
Figure 6:
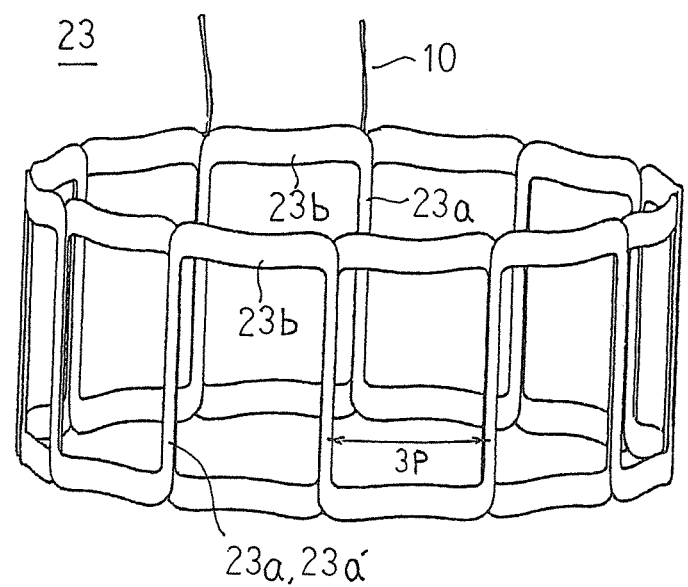
FIG. 6 is an oblique projection that shows a distributed winding unit in the automotive rotary electric machine stator manufacturing method according to Embodiment 1 of the present invention.
Figure 7:
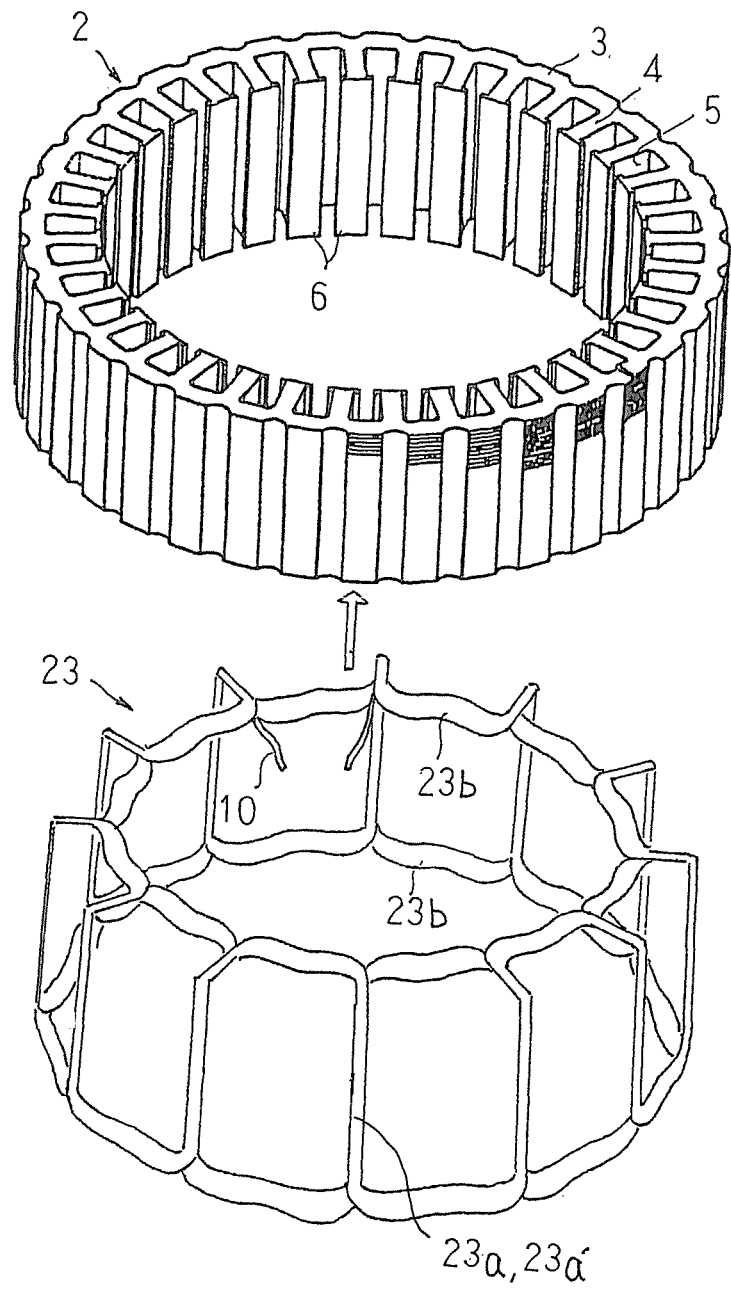
FIG. 7 is a process diagram that explains a step of mounting a distributed winding unit onto a stator core in the automotive rotary electric machine stator manufacturing method according to Embodiment 1 of the present invention.
Figure 8:
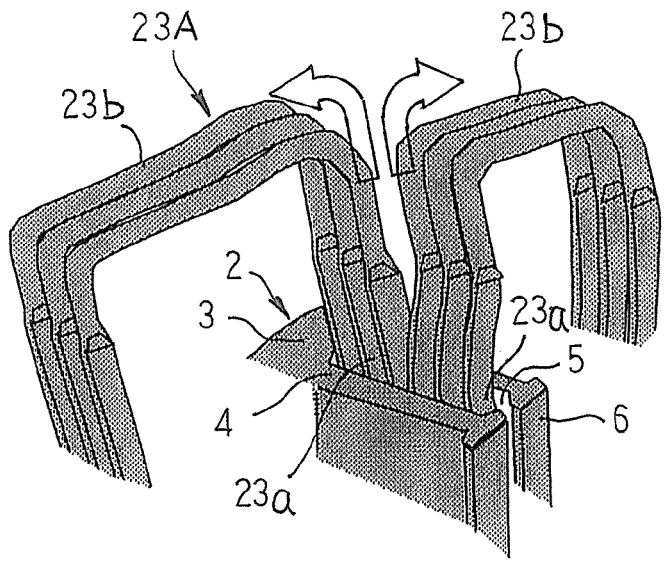
FIG. 8 is a partial oblique projection that explains movement of coil end portions in a step of mounting a distributed winding unit onto a stator core that functions as a comparative example.
Figure 9:
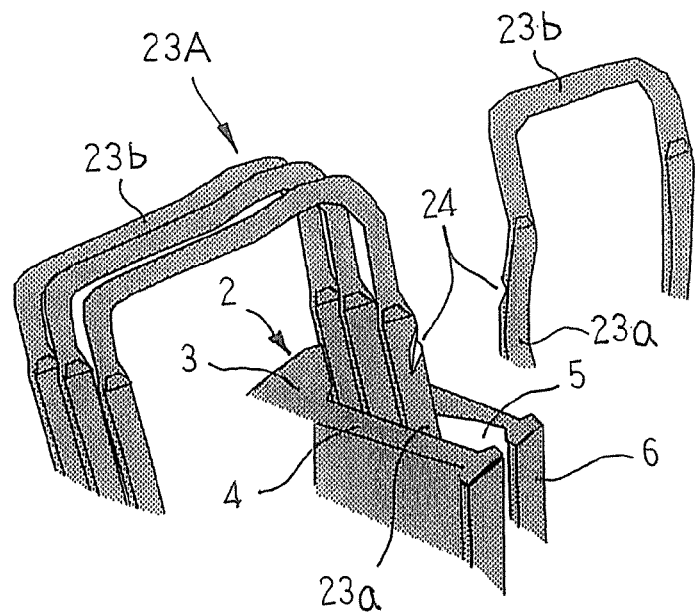
FIG. 9 is a partial oblique projection that shows a damaged state of insulating coatings of root portions of the coil end portions in the step of mounting the distributed winding unit onto the stator core that functions as a comparative example.

FIG. 1 is an oblique projection that shows an automotive rotary electric machine stator according to Embodiment 1 of the present invention, FIG. 2 is a partial cross section that explains a slot-housed state of a stator winding in the automotive rotary electric machine stator according to Embodiment 1 of the present invention, FIG. 3 is a partial end elevation that shows coil ends of the stator winding in the automotive rotary electric machine stator according to Embodiment 1 of the present invention when viewed from axially outside, FIG. 4 is a process diagram that explains steps for manufacturing a star-shaped winding unit that is used in the stator winding in the automotive rotary electric machine stator according to Embodiment 1 of the present invention, FIG. 5 is a process diagram that explains a cross section flattening step for slot-housed portions of the star-shaped winding unit in an automotive rotary electric machine stator manufacturing method according to Embodiment 1 of the present invention, FIG. 6 is an oblique projection that shows a distributed winding unit in the automotive rotary electric machine stator manufacturing method according to Embodiment 1 of the present invention, FIG. 7 is a process diagram that explains a step of mounting a distributed winding unit onto a stator core in the automotive rotary electric machine stator manufacturing method according to Embodiment 1 of the present invention, FIG. 8 is a partial oblique projection that explains movement of coil end portions in a step of mounting a distributed winding unit onto a stator core that functions as a comparative example, and FIG. 9 is a partial oblique projection that shows a damaged state of insulating coatings of root portions of the coil end portions in the step of mounting the distributed winding unit onto the stator core that functions as a comparative example.

In FIGS. 1 through 3, a stator 1 includes: a cylindrical stator core 2; and a stator winding 7 that is mounted onto this stator core 2.

The stator core 2 is produced into a cylindrical shape by laminating and integrating magnetic steel sheets that are pressed into a predetermined shape, and has: an annular core back portion 3; tooth portions 4 that are respectively disposed so as to extend radially inward from the core back portion 3 at a predetermined pitch circumferentially; slots 5 that are bounded by adjacent tooth portions 4; and flange portions 6 that extend outward in two circumferential directions from tip end portions of the tooth portions 4. Here, thirty-six slots 5 are formed on the stator core 2 at a uniform angular pitch circumferentially. Thus, a stator winding 7 that is constituted by a single three-phase alternating-current winding can be achieved in this stator 1 with a rotor (not shown) that has twelve magnetic poles. In other words, the slots 5 is formed at a ratio of one slot per phase per pole. A cross-sectional shape of each of the tooth portions 4 perpendicular to a central axis of the stator core 2 is formed into an approximately trapezoidal shape that tapers radially inward, and a cross-sectional shape of each of the slots 5 perpendicular to the central axis of the stator core 2 is rectangular.

The stator winding 7 includes three phases of distributed windings 8 that are mounted onto the stator core 2 such that the slots 5 into which they are mounted are offset by one slot each. The three phases of distributed windings 8 are AC-connected, for example, wye-connected, to constitute the three-phase alternating-current winding.

Each of the distributed windings 8 is configured by winding a single conductor wire 10 that is made of a copper wire material that is covered with an insulating coating for three turns in a wave shape in every third slot 5 in a first circumferential direction (clockwise, for example), and then winding the conductor wire 10 for three turns in a wave shape in every third slot 5 in a second circumferential direction (counterclockwise, for example). Portions of the conductor wires 10 that are housed inside the slots 5 constitute slot-housed portions 10a and 10a', and portions of the conductor wires 10 near axial ends of the stator core 2 that link together the slot-housed portions 10a and 10a' that are housed inside slots 5 that are three slots apart constitute coil end portions 10b.

The slot-housed portions 10a and 10a' are housed in contact with each other so as to be arranged in a single column radially in each of the slots 5. Insulators 11 are mounted inside the slots 5, and wedges 12 are mounted near openings of the slots 5.

The three slot-housed portions 10a that are housed on an inner circumferential side of each of the slots 5 are respectively linked by the coil end portions 10b at a first axial end of the stator core 2 to the three slot-housed portions 10a that are housed on the inner circumferential side of the slots 5 that are three slots away in the first circumferential direction, and are respectively linked by the coil end portions 10b at a second axial end of the stator core 2 to the three slot-housed portions 10a that are housed on the inner circumferential side of the slots 5 that are three slots away in the second circumferential direction. Here, as shown in FIG. 3, the coil end portions 10b link together the slot-housed portions 10a that are housed in the slots 5 that are three slots apart rectilinearly when viewed from axially outside the stator core 2.

The remaining three slot-housed portions 10a and 10a', which are housed on an outer circumferential side of each of the slots 5, are respectively linked by the coil end portions 10b at a first axial end of the stator core 2 to the three slot-housed portions 10a and 10a' that are housed on the outer circumferential side of the slots 5 that are three slots away in the second circumferential direction, and are respectively linked by the coil end portions 10b at a second axial end of the stator core 2 to the three slot-housed portions 10a and 10a' that are housed on the outer circumferential side of the slots 5 that are three slots away in the first circumferential direction. Here, as shown in FIG. 3, the coil end portions 10b link together the slot-housed portions 10a and 10a' that are housed in the slots 5 that are three slots apart rectilinearly when viewed from axially outside the stator core 2.

Thus, the conductor wires 10 of each of the distributed windings 8 that project outward from each of the slots 5 are distributed in the first and second circumferential directions. In each of the distributed windings 8, bundles of three coil end portions 10b are arranged circumferentially at a pitch of three slots. Thus, at the two axial ends of the stator core 2, layers of the bundles of coil end portions 10b that are arranged in a row circumferentially at a pitch of three slots are arranged into three layers in a radial direction so as to be offset by a pitch of one slot circumferentially to constitute coil end groups 7f and 7r of the stator winding 7.

Next, cross-sectional shapes of the distributed windings 8 that characterize the present invention will be explained. The slot-housed portions 10a and 10a' are formed so as to have racetrack-shaped cross sections. The coil end portions 10b are formed so as to have circular cross sections except for root portions that connect to the slot-housed portions 10a and 10a'. The root portions of the coil end portions 10b that connect to the slot-housed portions 10a and 10a' are formed so as to have racetrack-shaped cross sections that are similar or identical to those of the slot-housed portions 10a and 10a'. Moreover, a racetrack-shaped cross section is a shape in which two ends of two facing parallel line segments are linked by circular arcs.

As shown in FIG. 2, six slot-housed portions 10a and 10a' are housed in each of the slots 5 so as to be arranged in a single column radially such that longitudinal axes of the racetrack-shaped cross sections are oriented in a circumferential direction and long sides are in contact with each other. Among the six slot-housed portions 10a and 10a' that are housed in each of the slots 5, only the slot-housed portion 10a' that is positioned third from an outer circumferential side is formed so as to have a cross-sectional shape that has less flatness. Moreover, "flatness" is determined by dividing a length of the long sides of the racetrack-shaped cross sections by a length of the short sides of the racetrack-shaped cross sections.

Next, a method for manufacturing the stator 1 will be explained with reference to FIGS. 4 through 7.

As shown in FIG. 4, a single conductor wire 10 is wound for three turns into a ring shape to produce a first winding unit 20A, and then wound for another three turns into a ring shape to produce a second winding unit 20B. Next, the first and second winding units 20A and 20B are bent to produce first and second star-shaped winding units 21A and 21B in which star-shaped patterns in which end portions of adjacent rectilinear portions 21a are linked together alternately on an inner circumferential side and an outer circumferential side by angular C-shaped linking portions 21b are stacked in three layers. Moreover, the conductor wire 10 is formed so as to have a circular cross section that has a slightly smaller diameter than a gap between flange portions 6 of the stator core 2.

Next, the first and second star-shaped winding units 21A and 21B are folded over at the linking portion of the conductor wire 10, and the first and second star-shaped winding units 21A and 21B are stacked together such that peak portions and trough portions of the two star-shaped patterns overlap to produce a star-shaped winding unit 22.

Next, as shown in FIG. 5, each of the bundles of rectilinear portions 21a of the star-shaped winding unit 22 is set in a press-forming machine. Specifically, the rectilinear portions 21a of each of the bundles are stacked together between a pair of pushers (pressing plates) 40 in a single column, and flat pressing plates 41 are interposed between the respective rectilinear portions 21a. In addition, stoppers 42 are mounted between the pressing plates 41 that are positioned on opposite sides of the third rectilinear portion 21a from below.

A predetermined pressing force F is then applied to the pair of pushers 40. The rectilinear portions 21a, which have circular cross sections, are thereby compressed in the direction of pressure, and spread in a direction that is perpendicular to a longitudinal direction and the direction of pressure. Because the spreading direction of the rectilinear portions 21a is not constrained, the rectilinear portions 21a are formed into rectilinear portions 23 and 23' that have racetrack-shaped cross sections. Here, pressure from the pressing plates 41 that are positioned on opposite sides of the third rectilinear portion 21a from below toward the rectilinear portion 21a is limited by the stoppers 42 such that the third rectilinear portion 21a from below is formed into a rectilinear portion 23a' that has a racetrack-shaped cross section that has less flatness. The remaining five rectilinear portions 21a are formed into rectilinear portions 23a that have racetrack-shaped cross sections that have identical greater flatnesses. Next, the star-shaped winding unit 22 is removed from the press-forming machine.

Moreover, in FIG. 5, only one pair of pushers 40 is shown, but twelve pairs of pushers 40 are prepared, and all of the rectilinear portions 21a of the star-shaped winding unit 22 that have circular cross sections are formed into rectilinear portions 23 and 23' that have racetrack-shaped cross sections in a single cross section flattening step. Root portions of linking portions 23b are also simultaneously formed so as to have racetrack-shaped cross sections that are similar or identical to those of the rectilinear portions 23 and 23'.

Next, the star-shaped winding unit 22 is formed into a cylindrical distributed winding unit 23. In this distributed winding unit 23, the conductor wire 10 is wound into a wave winding for six turns. As shown in FIG. 6, bundles of six rectilinear portions 23 and 23' are arranged in columns at a pitch of three slots (3P) circumferentially. Each of the bundles of six rectilinear portions 23 and 23' is lined up in a single column radially such that cross-sectional longitudinal directions are oriented circumferentially. Three of the rectilinear portions 23 and 23' in each of the bundles are linked alternately at first and second axial ends by the linking portions 23b. In addition, the remaining three of the rectilinear portions 23 and 23' in each of the bundles are linked alternately at second and first axial ends by the linking portions 23b. Moreover, the linking portions 23b that link each set of three rectilinear portions 23 and 23' face each other in an axial direction.

Next, the linking portions 23b at a first axial end of the distributed winding unit 23 are bent radially inward. The distributed winding unit 23 is then disposed so as to be coaxial to the stator core 2, and the distributed winding unit 23 is moved axially so as to be mounted onto the stator core 2 from an axial direction, as indicated by the arrows in FIG. 7. At this point, the portions of the linking portions 23b that are bent radially inward move axially so as to pass between the flange portions 6, and the bundles of rectilinear portions 23 and 23' are pulled into each of the slots 5. After the bundles of rectilinear portions 23 and 23' are pulled into each of the slots 5 completely, the linking portions 23b that are bent radially inward are then rebent radially outward such that a first distributed winding unit 23 is mounted onto the stator core 2.

Next, a second distributed winding unit 23 is mounted onto the stator core 2 similarly, and a third distributed winding unit 23 is also mounted onto the stator core 2 similarly. Then, the linking portions 23b of each of the distributed winding units 23 that are bent radially outward are rebent so as to extend axially such that the stator 1 that is shown in FIG. 1 is produced. Here, each of the distributed winding units 23 is mounted onto the stator core 2 such that the slots 5 into which the rectilinear portions 23 and 23' are inserted are offset by one slot each. The distributed winding units 23 that are mounted onto the stator core 2 correspond to the distributed windings 8. The rectilinear portions 23 and 23' correspond to the slot-housed portions 10a and 10a', and the linking portions 23b correspond to the coil end portions 10b. The stator winding 7 is then configured by AC-connecting the three phases of distributed windings 8, such as by wye-connection, for example.

Now, problems when a distributed winding unit 23A that functions as a comparative example is mounted onto the stator core 2 will be explained with reference to FIGS. 8 and 9. Moreover, all of the rectilinear portions 23a and root portions of the linking portions 23b of the distributed winding unit 23A are formed so as to have identical racetrack-shaped cross sections, and portions of the linking portions 23b other than the root portions are formed so as to have circular cross sections.

The distributed winding unit 23A is moved axially with the linking portions 23b at the first axial end thereof bent radially inward in a similar or identical manner to the distributed winding unit 23, and after the bundles of rectilinear portions 23 and 23' are inserted into each of the slots 5, the linking portions 23b that are bent radially inward are then rebent radially outward such that a first distributed winding unit 23A is mounted onto the stator core 2.

Then, when the linking portions 23b of the distributed winding unit 23A are rebent radially outward, the linking portions 23b that extend from the slots 5 in a first circumferential direction are pulled in the first circumferential direction, and the linking portions 23b that extend from the slots 5 in a second circumferential direction are pulled in the second circumferential direction, as indicated by the arrows in FIG. 8. Thus, the root portions of the linking portions 23b that extend from the slots 5 in the first circumferential direction and that are positioned on the outermost circumference and the root portions of the linking portions 23b that extend from the slots 5 in the second circumferential direction and that are positioned on the innermost circumference are displaced in opposite circumferential directions, and rub against each other. In the worst case, tearing of the insulating coatings 24 occurs at corner portions of the root portions of the linking portions 23b, as shown in FIG. 9.

Moreover, similar problems also arise in a step of rebending the linking portions 23b of the distributed winding units 23A that are bent radially outward so as to extend axially, and also during springback after the linking portions 23b of the distributed winding units 23A are extended axially. Furthermore, similar problems also arise when vehicle vibration acts on the rotary electric machine.

In addition, the above-mentioned problems become more pronounced if the slot-housed portions 10a that are housed in the slots 5 that are three slots apart are linked together rectilinearly by the coil end portions 10b when viewed from axially outside the stator core 2.

According to Embodiment 1, the slot-housed portions 10a and 10a' and the root portions of the coil end portions 10b that connect to the slot-housed portions 10a and 10a' are formed so as to have similar or identical racetrack-shaped cross sections. Flatnesses of root portions of the coil end portions 10b that are radially adjacent and that extend in different circumferential directions are mutually different than each other. Thus, because interference between corner portions of the root portions of the coil end portions 10b that are radially adjacent and that extend in different circumferential directions is suppressed, the occurrence of tearing of the insulating coatings 24 that results from the root portions of the coil end portions 10b being displaced in opposite circumferential directions from each other is suppressed, enabling insulation performance to be improved.

Because the slot-housed portions 10a and 10a' are formed so as to have racetrack-shaped cross sections, the ratio of the cross-sectional area of the slots 5 that the electrical conductors occupy (space factor) is increased. Thus, generator efficiency can be improved when the automotive rotary electric machine operates as a generator, and output torque can be improved when it operates as an electric motor.

Because the coil end portions 10b link together the slot-housed portions 10a and 10a' that are housed in the slots 5 that are three slots apart rectilinearly when viewed from axially outside the stator core 2, length of the coil end portions 10b is shorter than when the coil end portions link the slot-housed portions together in a circular arc shape when viewed from axially outside the stator core, reducing copper loss, and enabling electric power generating efficiency to be increased.

Because portions of the coil end portions 10b other than the root portions are formed so as to have circular cross sections, large flexural stresses are less likely to be generated in the coil end portions 10b, which are subjected to bending and twisting, enabling reductions in workability and reliability to be suppressed.

Because the six rectilinear portions 21a of the star-shaped winding unit 22 that are inserted into each of the slots 5 are formed so as to have racetrack-shaped cross sections simultaneously, a cross section flattening step in which the rectilinear portions 21a are formed from circular cross sections into racetrack-shaped cross sections is shortened, improving productivity of the stator 1.

Moreover, in Embodiment 1 above, cross sections of bundles of rectilinear portions and root portions of coil end portions of a star-shaped winding unit that is configured by stacking three-turn first and second star-shaped winding units together so as to be offset in a circumferential direction are flattened simultaneously, but a star-shaped winding unit may be configured by flattening cross sections of bundles of rectilinear portions and root portions of coil end portions of a first star-shaped winding unit simultaneously, flattening cross sections of bundles of rectilinear portions and root portions of coil end portions of a second star-shaped winding unit simultaneously, and then stacking the first and second star-shaped winding units together so as to be offset in a circumferential direction.

In Embodiment 1 above, the first and second star-shaped winding units are produced using a single conductor wire, but the first and second star-shaped winding units may be produced using a single conductor wire for each. In that case, a star-shaped winding unit may be made by flattening cross sections of bundles of rectilinear portions and root portions of coil end portions of a first star-shaped winding unit simultaneously, flattening cross sections of bundles of rectilinear portions and root portions of coil end portions of a second star-shaped winding unit simultaneously, and then stacking the first and second star-shaped winding units together so as to be offset in a circumferential direction, and that star-shaped winding unit should be formed into a cylindrical distributed winding unit. Furthermore, first and second star-shaped winding units to which the cross-section-flattening process have been applied may be respectively formed into cylindrical first and second winding units, then the first winding unit mounted onto the stator core, and then the second winding unit mounted onto the stator core.

In Embodiment 1 above, the root portion of the third coil end portion from an outer circumferential side is formed so as to have a cross-sectional shape that has less flatness, but the root portion of the fourth coil end portion from the outer circumferential side may be formed so as to have a cross-sectional shape that has less flatness.

In Embodiment 1 above, wedges are mounted into opening portions of the slots, but because long sides of the racetrack-shaped cross sections of the slot-housed portions are longer than gaps between the flange portions 6, the wedges may be omitted.

Embodiment 2

Figure 10:
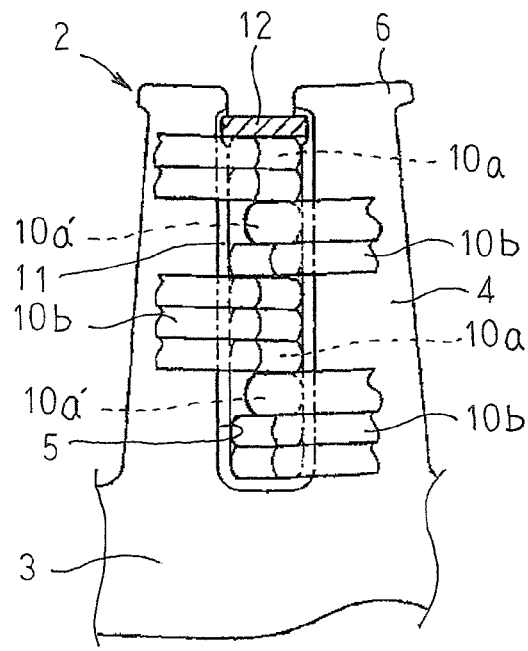
FIG. 10 is a partial end elevation that shows coil ends of a stator winding in an automotive rotary electric machine stator according to Embodiment 2 of the present invention when viewed from axially outside.

FIG. 10 is a partial end elevation that shows coil ends of a stator winding in an automotive rotary electric machine stator according to Embodiment 2 of the present invention when viewed from axially outside.

In FIG. 10, phase windings are each are configured into ten-turn distributed windings by winding a single conductor wire 10 for three turns in a wave shape in every third slot 5 in a first circumferential direction, then changing direction and winding the conductor wire 10 for three turns in a wave shape in every third slot 5 in a second circumferential direction, then changing direction and winding the single conductor wire 10 for two turns in a wave shape in every third slot 5 in the first circumferential direction, then changing direction and winding the conductor wire 10 for two turns in a wave shape in every third slot 5 in the second circumferential direction.

Slot-housed portions 10a and 10a' and root portions of coil end portions 10b that connect to the slot-housed portions 10a and 10a' are formed so as to have racetrack-shaped cross sections. Portions of the coil end portions 10b other than the root portions are formed so as to have circular cross sections.

Ten slot-housed portions 10a and 10a' are housed in each of the slots 5 so as to be arranged in a single column radially such that longitudinal axes of the racetrack-shaped cross sections are oriented in a circumferential direction and long sides are in contact with each other. Among the ten slot-housed portions 10a and 10a' that are housed in each of the slots 5, the slot-housed portions 10a' that are positioned third and eighth from an outer circumferential side are formed so as to have cross-sectional shapes that have less flatness.

Moreover, the rest of the configuration is formed in a similar or identical manner to that of Embodiment 1 above.

In Embodiment 2, because flatnesses of root portions of the coil end portions 10b that are radially adjacent and that extend in different circumferential directions are mutually different than each other, similar or identical effects to those in Embodiment 1 above are also exhibited.

Moreover, in Embodiment 2 above, phase windings are constituted by ten-turn distributed windings that are produced using single conductor wires, but phase windings may be constituted by outer circumferential six-turn distributed windings that are produced using first single conductor wires, and inner circumferential four-turn distributed winding that are produced using second single conductor wires.

In Embodiment 2 above, a three-turn wave winding portion that extends outward in a first circumferential direction from slots, a three-turn wave winding portion that extends outward in a second circumferential direction from the slots, a two-turn wave winding portion that extends outward in the first circumferential direction from the slots, and a two-turn wave winding portion that extends outward in the second circumferential direction from the slots are arranged sequentially from an outer circumferential side, but the order of arrangement of the wave winding portions in the radial direction is not limited thereto. A three-turn wave winding portion that extends outward in the first circumferential direction from slots, a two-turn wave winding portion that extends outward in the second circumferential direction from the slots, a two-turn wave winding portion that extends outward in the first circumferential direction from the slots, and a three-turn wave winding portion that extends outward in the second circumferential direction from the slots may be arranged sequentially from an outer circumferential side, for example.

Embodiment 3

Figure 11:
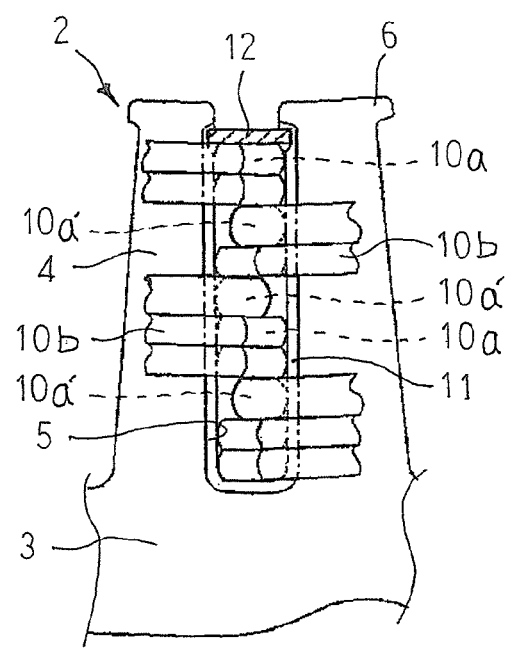
FIG. 11 is a partial end elevation that shows coil ends of a stator winding in an automotive rotary electric machine stator according to Embodiment 3 of the present invention when viewed from axially outside.
Figure 12:
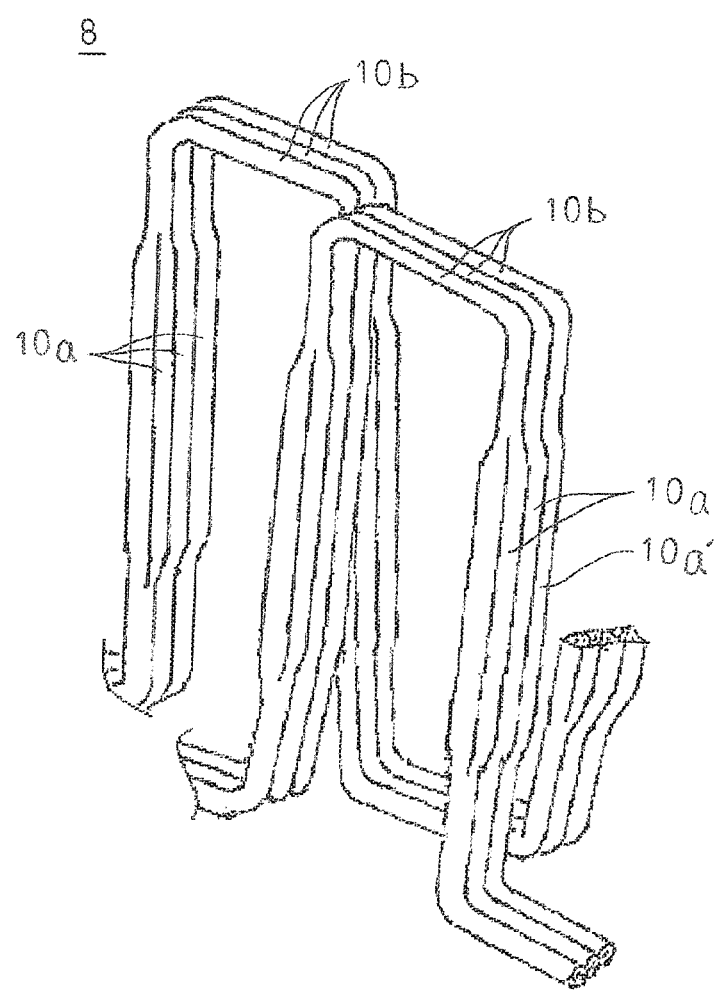
FIG. 12 is a non-limiting illustration of a partial oblique projection showing portions of said coil end portions other than said root portions are formed so as to have a circular cross section.

FIG. 11 is a partial end elevation that shows coil ends of a stator winding in an automotive rotary electric machine stator according to Embodiment 3 of the present invention when viewed from axially outside.

In FIG. 11, ten slot-housed portions 10a and 10a' are housed in each of the slots 5 so as to be arranged in a single column radially such that longitudinal axes of the racetrack-shaped cross sections are oriented in a circumferential direction and long sides are in contact with each other. Among the ten slot-housed portions 10a and 10a' that are housed in each of the slots 5, the slot-housed portions 10a' that are positioned third, sixth, and eighth from an outer circumferential side are formed so as to have cross-sectional shapes that have less flatness.

Moreover, the rest of the configuration is formed in a similar or identical manner to that of Embodiment 2 above.

According to Embodiment 3, because flatnesses of root portions of the coil end portions 10b at all positions that are radially adjacent and that extend in different circumferential directions are mutually different from each other, the occurrence of tearing of the insulating coatings 24 that results from the root portions of the coil end portions 10b being displaced in opposite circumferential directions from each other is further suppressed, enabling insulation performance to be further improved.

Moreover, in each of the above embodiments, the slots are formed at a ratio of one slot per phase per pole, but the number of slots per phase per pole is not limited to one, and may be two, for example.

In each of the above embodiments, slot-housed portions and root portions of coil end portions are formed so as to have racetrack-shaped cross sections, but the cross sections of the slot-housed portions and the root portions of the coil end portions are not limited to racetrack shapes, provided that the cross section is flat, and may be rectangular cross sections, for example. Furthermore, it is not absolutely necessary for corner portions of the rectangular cross sections to be perpendicular, and the corner portions may have rounded shapes.

In each of the above embodiments, the slot-housed portions are housed in the slots in contact with each other so as to line up in a single column in a radial direction such that the longitudinal axes of the flat cross sections are oriented circumferentially, but the number of radial columns of slot-housed portions is not limited to a single column, and the slot-housed portions need only be housed inside the slots in contact with each other so as to be arranged neatly in columns, and may be housed inside the slots so as to line up in two columns in the radial direction, for example.

In each of the above embodiments, the slot-housed portions are housed in the slots in contact with each other so as to line up in a single column in a radial direction such that the longitudinal axes of the flat cross sections are oriented circumferentially, but the slot-housed portions may be housed in the slots in contact with each other so as to line up in a single column in a radial direction such that the longitudinal axes of the flat cross sections are oriented radially.

In each of the above embodiments, the slot-housed portions and the root portions of the coil end portions that connect to the slot-housed portions have identical or identical cross-sectional shapes, but the slot-housed portions and the root portions of the coil end portions that connect to the slot-housed portions have different cross-sectional shapes.

In each of the above embodiments, the coil end portions link together pairs of slot-housed portions that are three slots apart rectilinearly when viewed from axially outside the stator core, but the coil end portions may link together pairs of slot-housed portions that are three slots apart in radially outward convex circular arc shapes when viewed from axially outside the stator core.

The invention claimed is:

1. An automotive rotary electric machine stator comprising:
    a stator core that includes:
    a cylindrical core back portion;
    a plurality of tooth portions that are arranged in a row circumferentially such that each extends radially inward from an inner circumferential surface of said core back portion; and
    a plurality of slots that are bounded by said core back portion and said tooth portions; and
    a stator winding that is mounted onto said stator core, wherein:
    said stator winding is constituted by distributed windings that include:
    slot-housed portions that are housed in each of said slots; and
    coil end portions that link together end portions of said slot-housed portions that are housed in pairs of said slots that are separated by a predetermined number of slots, said coil end portions extending outward in two circumferential directions from each of said slots;
    said slot-housed portions and root portions of said coil end portions that connect to said slot-housed portions are formed so as to have flat cross sections;
    said slot-housed portions are housed inside said slots in contact with each other so as to line up radially in at least one column; and
    flatnesses of root portions of two coil end portions that are radially adjacent and that extend outward in different circumferential directions from said slots are mutually different, and the flatness of a root portion of one of said two coil end portions positioned radially inward is greater than the flatness of a roof portion of the other of said two coil end portions positioned radially outward.

2. The automotive rotary electric machine stator according to claim 1, wherein said coil end portions link together said end portions of said slot-housed portions that are housed in said pairs of slots that are separated by said predetermined number of slots rectilinearly when viewed from axially outside said stator core.

3. The automotive rotary electric machine stator according to claim 1, wherein portions of said coil end portions other than said root portions are formed so as to have a circular cross section.

4. An automotive rotary electric machine stator manufacturing method comprising:
    a step of producing a plurality of winding units by winding a conductor wire that has a circular cross section into a ring shape for a predetermined number of turns;
    a step of producing a plurality of star-shaped winding units by bending each of said plurality of winding units into star-shaped patterns in which end portions of adjacent rectilinear portions are linked alternately on an inner circumferential side and an outer circumferential side by angular C-shaped linking portions such that said star-shaped patterns are stacked in multiple layers;
    a step of stacking together said plurality of star-shaped winding units so as to be offset circumferentially such that said linking portions of said star-shaped patterns face each other radially and said rectilinear portions are stacked axially;
    a cross section flattening step in which said rectilinear portions and root portions of said linking portion that are stacked axially in each of said plurality of star-shaped winding units are formed so as to have flat cross sections;
    a step of forming said plurality of star-shaped winding units that are stacked together into a cylindrical distributed winding unit; and
    a step of mounting said distributed winding unit onto a cylindrical stator core,
    wherein:
    said rectilinear portions and said root portions of said linking portions that are stacked axially are flattened simultaneously in said cross section flattening step such that a first rectilinear portion and root portions of linking portions that are connected to said first rectilinear portion among rectilinear portions and root portions of linking portions that are positioned at a stacked-together portion of said plurality of star-shaped winding units have a first flatness, and all remaining rectilinear portions and root portions of linking portions of said plurality of star-shaped winding units have a second flatness that is greater than said first flatness, wherein a root portion of one of two coil end portions that are radially adjacent and that extend outward in different circumferential directions from said slots positioned radially outward has said first flatness, and a root portion of the other of said two coil end portions positioned radially inward has said second flatness.

* * * * *